(12) United States Patent
Blach et al.

(10) Patent No.: US 10,035,291 B2
(45) Date of Patent: Jul. 31, 2018

(54) SIDE FEEDER WITH REARWARDS VENTILATION

(71) Applicant: Blach Verwaltungs GmbH & Co. KG, Lauffen (DE)

(72) Inventors: Markus Blach, Lauffen (DE); Michael Blach, Neckarwestheim (DE)

(73) Assignee: Blach Verwaltungs GmbH & Co. KG, Lauffen (DE)

( * ) Notice: Subject to any disclaimer, the term of this patent is extended or adjusted under 35 U.S.C. 154(b) by 159 days.

(21) Appl. No.: 15/028,612

(22) PCT Filed: May 23, 2014

(86) PCT No.: PCT/EP2014/001391
§ 371 (c)(1),
(2) Date: Apr. 11, 2016

(87) PCT Pub. No.: WO2015/051859
PCT Pub. Date: Apr. 16, 2015

(65) Prior Publication Data
US 2016/0346984 A1    Dec. 1, 2016

(30) Foreign Application Priority Data
Oct. 11, 2013  (DE) .......................... 10 2013 016 873

(51) Int. Cl.
*B29C 47/36* (2006.01)
*B29C 47/76* (2006.01)
(Continued)

(52) U.S. Cl.
CPC ........ *B29C 47/763* (2013.01); *B29C 47/1045* (2013.01); *B29C 47/366* (2013.01); *B29C 47/369* (2013.01); *B29C 47/68* (2013.01)

(58) Field of Classification Search
CPC ... B29C 7/366; B29C 47/369; B29C 47/1045; B29C 47/68; B29C 47/763
(Continued)

(56) References Cited

U.S. PATENT DOCUMENTS 3,212,133 A * 10/1965 Heidrich ................. B29C 45/63
                                                    159/2.2
3,535,737 A * 10/1970 Hendry ................. B29C 45/581
                                                    159/2.2
(Continued)

FOREIGN PATENT DOCUMENTS

DE       23 28 689 A1    1/1975
DE         2328689 A1    1/1975
(Continued)

OTHER PUBLICATIONS

PCT International Preliminary Report on Patentability, International Application PCT/EP2014/001391, dated Apr. 2, 2016, 7 pages.

*Primary Examiner* — Tony G Soohoo
(74) *Attorney, Agent, or Firm* — Tucker Ellis LLP; Heather Barnes; Michael Craig

(57) ABSTRACT

Device for lateral flow charging of an extruder in which material is fed to at least one conveyor screw disposed in an extruder housing. The material contains gaseous concomitant materials, wherein a degassing housing for receiving an air flow is disposed on the extruder housing, which air flow acts in the extruder housing and which is directed contrary to the conveying direction of the conveyor screw.

15 Claims, 6 Drawing Sheets

(51) Int. Cl.
*B29C 47/68* (2006.01)
*B29C 47/10* (2006.01)

(58) Field of Classification Search
USPC .................................................. 366/75, 76.3
See application file for complete search history.

(56) References Cited

U.S. PATENT DOCUMENTS

| | | | | | |
|---|---|---|---|---|---|
| 3,563,514 | A | * | 2/1971 | Shattuck | B29C 45/581 159/2.2 |
| 3,572,647 | A | * | 3/1971 | Staheli | B29C 47/38 366/75 |
| 3,742,093 | A | * | 6/1973 | Skidmore | B29C 47/402 159/2.2 |
| 3,917,507 | A | * | 11/1975 | Skidmore | B29C 47/362 159/2.2 |
| 3,985,348 | A | * | 10/1976 | Skidmore | B29C 47/1063 366/75 |
| 4,004,787 | A | * | 1/1977 | Ellwood | B29C 47/08 366/75 |
| 4,054,271 | A | * | 10/1977 | Lanzillo | A23G 3/0226 366/70 |
| 4,117,548 | A | * | 9/1978 | Craig | B29C 47/76 366/83 |
| 4,120,050 | A | * | 10/1978 | Craig | B29C 47/76 159/2.2 |
| 4,260,264 | A | * | 4/1981 | Maki | C02F 11/008 366/139 |
| 4,491,417 | A | * | 1/1985 | Hold | B29C 47/525 159/2.2 |
| 4,649,005 | A | * | 3/1987 | Kobayashi | B29B 7/82 264/101 |
| 4,763,569 | A | * | 8/1988 | Wenger | A21C 11/20 366/75 |
| 4,776,784 | A | * | 10/1988 | Batiuk | B29C 47/40 366/75 |
| 4,900,494 | A | * | 2/1990 | Wobbe | B29C 47/38 264/102 |
| 5,123,828 | A | * | 6/1992 | Surface | B29C 47/767 366/75 |
| 5,130,070 | A | * | 7/1992 | Martin | B29C 47/0808 159/2.2 |
| 5,232,649 | A | * | 8/1993 | Andersen | B29B 15/06 159/2.1 |
| 5,283,021 | A | * | 2/1994 | Shih | B29C 47/763 159/3 |
| 5,297,864 | A | * | 3/1994 | Knoll | B29C 47/76 366/75 |
| 5,338,112 | A | * | 8/1994 | Boden | B29B 7/7461 159/3 |
| 5,385,462 | A | * | 1/1995 | Kodama | B29C 45/63 366/75 |
| 5,626,420 | A | * | 5/1997 | Deal | B29B 7/42 366/75 |
| 5,662,415 | A | * | 9/1997 | Gisko | B01F 7/245 366/139 |
| 6,129,873 | A | * | 10/2000 | Shelby | B29C 47/767 264/102 |
| 6,220,745 | B1 | * | 4/2001 | Kobayashi | B29C 47/0871 366/142 |
| 6,387,306 | B1 | * | 5/2002 | Morohashi | B29B 7/007 264/102 |
| 6,422,732 | B1 | * | 7/2002 | Maris | B29C 47/763 366/75 |
| 7,040,797 | B1 | * | 5/2006 | Yamaguchi | B29B 7/487 366/76.1 |
| 7,380,973 | B2 | * | 6/2008 | Goedicke | B29C 47/42 366/75 |
| 2006/0089487 | A1 | | 4/2006 | Silvi et al. | |
| 2014/0039142 | A1 | * | 2/2014 | Paul | B29C 47/62 526/295 |
| 2015/0314513 | A1 | * | 11/2015 | Takamoto | B29C 47/68 366/75 |

FOREIGN PATENT DOCUMENTS

| | | |
|---|---|---|
| DE | 32 27 983 A1 | 3/1983 |
| DE | 102 01 869 A1 | 7/2003 |
| DE | 203 20 505 U1 | 9/2004 |
| DE | 20 2007 011 767 U1 | 1/2009 |
| DE | 202007011767 U1 | 1/2009 |
| DE | 20 2012 001 277 U1 | 11/2012 |
| DE | 202012001277 U1 | 11/2012 |
| EP | 2 353 839 A1 | 8/2011 |
| EP | 2353839 A1 | 8/2011 |
| EP | 2218568 B1 | 1/2012 |
| EP | 2 439 044 A1 | 4/2012 |
| JP | 2002-210805 A | 7/2002 |
| JP | 2002210805 A | 7/2002 |
| JP | 2002-355880 A | 12/2002 |
| JP | 2011-245721 A | 12/2011 |
| JP | 2011245721 A | 12/2011 |
| WO | 2006/042613 A1 | 4/2006 |
| WO | 2006042613 A1 | 4/2006 |
| WO | 2009/136904 A2 | 11/2009 |
| WO | 2009136904 A2 | 11/2009 |

* cited by examiner

SIDE FEEDER WITH REARWARDS VENTILATION

This application claims priority to PCT Application No. PCT/EP2014/001391 filed on May 23, 2014, which claims priority to German Patent Application No. DE 10 2013 016 873.2 filed on Oct. 11, 2013, both of which are incorporated herein in their entirety.

BACKGROUND

A side feeder is frequently used when adding in particular powdery substances in the extruder. Such a device is frequently used in the extrusion process for the lateral charging of the main extruder and assists the manufacture of high-quality products. The material throughput is increasing continuously in modern extrusion systems so that the product quantities, in particular the additives which must be fed to the extruder system are becoming increasingly greater. It has proved to be disadvantageous that gaseous concomitant materials such as, for example, intermediate air are conveyed in the pores of the material and in particular in powdery substances. However, the gaseous concomitant materials cannot flow into the conveyor screw of the extruder system since they cannot be transported via completely filled zones in the conveyor screw. Practice shows that the gaseous concomitant materials flow back into the feed housing, in particular into the feed hopper and counteract the inflow of material to be conveyed, which can have a negative influence on the supplied quantity of material.

A screw machine for the treatment of at least partially powdery material is deduced from EP 2 218 568B 1. The machine comprises a housing with a feed opening which is disposed at one end of the housing and which is used for feeding material. Furthermore, at least one conveyor screw is provided in a housing bore. In addition, a metering device is provided which is located upstream of the feed opening and which is used for feeding material. In addition, a vacuum housing section is provided which is configured detachably in the housing. The vacuum housing section is a filter unit in the form of a metal nonwoven which is held exchangeably as a gas-permeable wall section on a base body.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation a device for lateral flow charging of an extruder is disclosed where material may be fed to at least one conveyor screw disposed in an extruder housing. The material may comprise gaseous concomitant materials. The device may comprise a degassing housing for receiving an air flow disposed on the extruder housing. Air flow may act in the extruder housing and may be directed contrary to a conveying direction of the conveyor screw.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
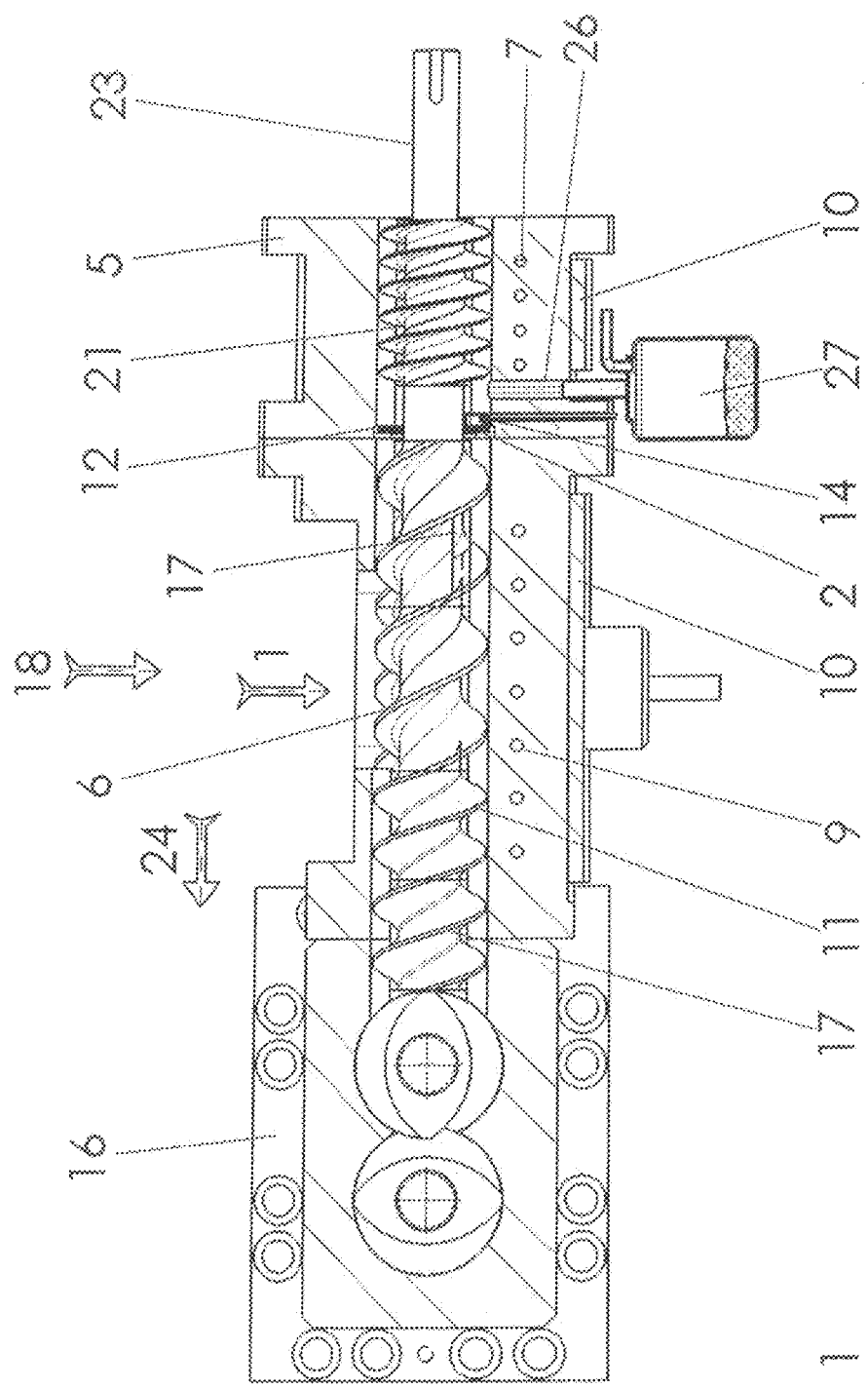
FIG. 1 shows an extruder system in side view with extruder housing, main extruder and degassing housing.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The invention relates to an extruder device in which material to be conveyed is fed for transport purposes and/or for further processing to at least one conveyor screw disposed in an extruder housing, where the material to be conveyed comprises gaseous concomitant materials, in particular air and/or material particles. In particular, the invention relates to a device designated in the field as side feeder, which is used in extruder systems. The term side feeder is a common reference to devices for side flow charging with rearwards ventilation of the extruder.

In addition, a mixing of material, in particular additives and gaseous concomitant materials, in particular air, can lead to a fluidization of the material to be conveyed. The material may be transferred into a fluidized state as a result of the upward-directed flow of air. As a result, the material acquires fluid-like properties such as, for example, water. Comparably to a fluidized layer, individual particles of the material can be brought to sink and to re-emerge again due to variation of the fluidization rate.

It is therefore the object of the invention to free the material fed to an extruder system from gaseous concomitant materials as far as possible.

The object may be solved by arranging a degassing housing on the drive side on the extruder housing of the side feeder, into which a blower device adjusts a gas flow which may be directed out from the extruder housing contrary to the conveying direction of the conveyor screw. Unless mentioned otherwise, the following explanations relate to the extruder device of the side feeder.

A device may be provided in which the material may be fed from above into the housing of the side feeder of at least one conveyor screw disposed in the extruder housing. The side feeder itself may be connected laterally to the main extruder. The device may be therefore also designated as side feeder. Naturally the material to be conveyed can also be supplied on other sides on the extruder system.

At least one conveyor screw may be disposed in the extruder housing of the extruder system which transports the material or mixes it for further processing with other material to be conveyed which are fed to the extruder system via a further feed housing.

The conveyor screw may consist of individual screw segments which are threaded onto the supporting shaft.

The conveyor screw furthermore may have at least one different pitch of the screw segments.

According to the invention, a degassing housing adjoins the side of the extruder housing facing away from the conveyor screw.

According to the invention, the gaseous concomitant materials, in particular air, should be extracted towards the rear, contrary to the conveying direction of the side feeder screws. A blower device may be provided, which brings about a gas flow in the housing, which may be directed contrary to the conveying direction of the at least one conveyor screw and which extends from the degassing housing into the extruder housing. The gas flow can in particular be an air flow but can also consist of water vapour or other components in a gaseous aggregation state.

The gas flow can bring about a vacuum, a negative pressure or a suction in the extruder housing and also in the degassing housing which separates the gaseous concomitant materials from the material and feeds them to an exhaust air device.

An exhaust air device may be provided for removing the gaseous concomitant materials from the degassing device. The exhaust air device may be arranged at the end of the degassing housing facing away from the conveyor screw and enables the removal of the gaseous concomitant materials separated from the material to be conveyed into the open.

It may be further possible that the gaseous concomitant materials extracted contrary to the conveying direction of the conveyor screw contain particles of material. Insofar as this is not expressly mentioned otherwise in this description, the technical teaching also applies in this respect.

It should further be mentioned that the screw separates the entrained solid from the gas flow in a type of labyrinth seal and conveys it in the conveying direction in the direction of the main extruder.

Insofar as there is talk of a screw within the framework of this application, it is clarified that a plurality of screws should also be meant thereby.

In order that no particles from the degassing housing enter into the exhaust air device, a filter may be provided between the degassing housing and the exhaust air device, which retains material contained in the gas flow.

At least one auxiliary extruder may be provided in the degassing housing, which separates material retained in the filter from the filter and feeds the conveyor screw in the extruder housing. The auxiliary extruder can be arranged on the drive shaft of the conveyor screw and can in this way be connected to the conveyor screw. The auxiliary extruder therefore may comprise at least one screw and a drive connected thereto.

A filter, which may be a filter disk or a sealing element may be disposed between the extruder housing and the degassing housing. The sealing element may be disposed individually or in combination with a filter disk on a shaft.

The filter disk may have the effect that material which may be entrained in the gas flow from the extruder housing in the direction of the degassing housing may be prevented from leaving the extruder housing. With the aid of the sealing element of the sealing disk, the transition between the extruder housing and the degassing housing can be sealed in a gastight manner.

A main extruder which takes the material received in the conveyor screw for further processing may be located at the downstream end in the conveying direction behind the extruder housing.

The advantage of the invention lies in that the gaseous concomitant materials in the region of the conveyor screw are removed from the extruder housing in the rearward direction contrary to the conveying direction of the conveyor screw into a degassing housing and entrained material may be conveyed back in the direction of the main extruder.

A further advantage of the invention consists in that a gas flow may be adjusted in the degassing housing which may be directed contrary to the conveying direction of the conveyor screw and extends in its suction effect to the extruder housing. In this way, gaseous concomitant materials are separated from the supplied material to be conveyed and led away in the rearward direction.

The invention furthermore proves to be advantageous since the at least two-stage filter device with the aid of the filter disk prevents any escape of material particles into the degassing housing. Material particles which, for example, as a result of their particle size have entered into the degassing housing, are prevented from escaping into the exhaust air device by the filter.

Material captured in the filter may be fed to the auxiliary extruder which removes the material particles from the filter and feeds them back to the conveyor screw.

The invention additionally proves to be advantageous since the filter and/or the filter disk can be subjected to a back flushing by separating material particles from the surfaces of the filter and/or the filter disk through a reversal of the direction of flow of the gas flow. The material residues separated by the back flushing are fed to the auxiliary extruder in the case of the filter. Material residues separated by the filter disk as a result of the back flushing are grasped directly by the conveyor screw and fed to further processing.

The material to be conveyed may comprise material as well as gaseous concomitant materials. The term material may be to be understood in this case as powdery or granular fillers, additives or also cut fibres as well as granular or piece-like heterogeneous mixtures. Furthermore, the material can be present in bulk form; in this case it may be determined in its properties by the grain size and the grain distribution as well as the bulk density, the angle of repose, the moisture and the temperature.

The term 'material' further includes cohesionless, free-flowing as well as cohesive and consistent materials which can move freely in a container or are not secured otherwise in their position. The materials can also be bulk goods.

Material can furthermore be mixtures in the form of substance mixtures, which may comprise at least two pure substances. However, heterogeneous mixtures can also be present whose components can only be blended with one another but cannot be mixed homogeneously.

Material also includes building materials such as, for example, top soils, sand, gravel and cement. Material can however also include raw materials such as, for example, ores, coals or road salts. Furthermore, the material also includes foodstuffs such as types of cereal, sugar, salt, coffee and flour. The term material also covers material, in particular all natural rubber and vulcanized rubber materials, or also ground natural rubber and vulcanized rubber crumbs, such as are used for manufacturing tyres or other vulcanized rubber products. The preceding examples are in no way exclusive but only intended as exemplary. The term material can mean additives or any type and quality.

Material in the sense of this invention may be also designated hereinbefore and hereinafter as material to be conveyed.

The material to be conveyed which may be fed to the conveyor screw through the feed housing also covers gaseous concomitant materials. The concomitant materials can adhere to the material or also be included in material pores. Gaseous concomitant materials are primarily substances whose particles move freely at a great distance from one another and uniformly fill the available space.

The at least one conveyor screw and the at least one auxiliary extruder are configured as screw conveyors which are each disposed in an extruder housing and transport the motor-driven material over a certain distance and/or blend it with further additives. A rotation of the material with the screw may be prevented due to gravity and due to the friction of the material at the screw walls, and the material may be transported continuously further through the screw turns.

The conveyor screw and the auxiliary extruder may comprise a screw trough, a screw thread, a drive shaft with drive unit and an inlet and an outlet. The same naturally also applies to the main extruder or other forms of extruder to which the invention can be applied.

The conveyor screw may comprise a screw, with a closely intermeshing Erdmengerl scraping profile or having a standard profile. The pitch of the screw may be greater than the pitch of the screw of the auxiliary extruder which may be disposed in the degassing housing. The pitch of the respective screw can be configured multiply differently.

The smaller pitch of the screw of the auxiliary extruder has the effect that as much material as possible, in particular powder, may be deposited at the numerous deflection points of the auxiliary extruder and can be conveyed by the screw of the auxiliary extruder again in the direction of the conveyor screw. The screws, which have shear edges and comparatively small pitches, enable effective cleaning of the porous material, in particular the sinter material, from the filter surfaces. Since only a very small material flow may be guided along the filter material, the risk of filter surfaces becoming clogged and blocked can be effectively avoided.

The elements with a shear edge generally have a larger free volume than the corresponding elements with a sealing profile. This initially gives a larger conveyor volume.

Equally, according to the invention however, screws can also be provided for the auxiliary extruder which has a larger pitch.

Advantageously the pitch can lie in the range of 30-90°; it may be particularly advantageous to provide a range of 40-60° and quite particularly advantageously a range of about 45°.

These range details also apply to the conveyor screw.

An additional use of metal nonwoven on filters and/or filter disks which must be expensively supported can be omitted, but is not eliminated.

A shear edge may be disposed on the conveyor screw and/or on the auxiliary extruder, which increases the conveyor throughput in the case of the conveyor screw. In the case of the auxiliary extruder, the shear edge releases material adhering to the filter disk and feeds it to the extruder housing. At least one filter disk can be provided which may be disposed on the drive shaft.

It may be particularly advantageous in the region of the intake and in particular also in the region of the filter scraper that in the longitudinal section the screw edge may be approximately perpendicular to the filter surface that may be the adhering product may not be "pushed" into the gap but rather may be scraped from the filter surface. The referenced gap may be in this case disposed between the screw and the filter.

It may be further advantageous if, in the course of the side feeder screw, the shear edge profile may be initially converted into a normal sealing profile after the filling opening. A first volume reduction of about 20-35% may be thereby accomplished.

The screw pitch may be then reduced in order to compact the material in the direction of the main extruder and be able to convey it into the main extruder at a certain pressure.

Material which has deposited on the filter and/or on the filter disk can be sintered at elevated pressure and by supplying thermal energy. During sintering the temperatures of the material remain below the melting point so that the shape of the material may be retained. However, the material may be compacted since the particles are compressed and the pore spaces are filled.

The material residues separated from the filter and/or from the filter disk are fed by the screw of the auxiliary extruder from the degassing housing to the conveyor screw located in the extruder housing. In this case, it may be advantageous to provide and interpose a discharge device in the region of the degassing housing which initially transfers the separated material residues into an additional collecting container. From this collecting container the material residues are fed to the conveyor screw located in the extruder housing.

Various design configurations are available for the configuration of the discharge device, the collecting container and the feed device. The person skilled in the art will readily find a suitable embodiment for these purposes.

The conveyor screw, the at least one auxiliary extruder and the at least one further main extruder can be a double-shaft extruder or a multi-shaft extruder. They can in particular be ring extruders.

In order to form functional zones, segments can be provided on at least one conveyor screw and/or on the screw of the auxiliary extruder. Screws having a small pitch and shear edges are used on the auxiliary extruder for cleaning the filter surfaces. Screws having a great pitch and shear edges promote a high conveyor volume on the conveyor screw. The transition to the normal profile combined with a compaction with a small pitch achieves an optimal conveying in the region of the main extruder.

The feed housing and/or the drain device can have comprehensive or partial cooling devices. At the same time and/or additionally, heating devices can be provided for temperature control of the material, which may be used for the temperature control of individual material components.

The cooling devices can be used for cooling material component. It may be also feasible to cool filters and/or filter disks in order to prevent melting of material particles on the filter and/or on the filter disk. The extruder housing can already be cooled whilst the feed housing may be still hot in order to preheat the product and therefore be able to further increase the material throughput.

The degassing housing has a device for producing a gas flow which results in a vacuum or a negative pressure in the extruder housing and in the degassing housing. The gas flow can be brought about by a blower or by any other device which can produce a gas flow.

The gas flow may be aligned inside the degassing housing contrary to the conveying direction of the conveyor screw. It sucks the gaseous concomitant materials from the extruder housing and feeds them through the degassing housing to the exhaust air device. There may be no backflow of gaseous concomitant materials contrary to the direction in which the material may be fed into the feed housing. The back-flowing quantities of air thus no longer prevent the material inflow into the feed housing.

The gas flow direction can be reversed -so that the at least one filter and/or the at least one filter disk can be cleaned by a compressed air flushing and can be freed from adhering material. The filter disk can be provided with a narrow air flushing beam from behind which back flushes the filter disk. This can be accomplished continuously or intermittently.

The exhaust air device can be located at the side on the degassing housing or on the upper side of the degassing housing.

The filter and/or the filter disk can be fabricated from sintered material. Naturally it may be also feasible that the at least one filter and/or the at least one filter disk comprise metallic materials and/or non-metallic materials.

FIG. 1 shows an extruder system with an extruder housing 15 which may be disposed between a main extruder 16 and a degassing housing 5.

The conveyor screws 17 may have a standard profile 11 on which shear edges 6 may be arranged. Relative to the profile of the conveyor screw 17, respectively one heating device 10 and a cooling device 9 may be provided underneath the conveyor screw 17 in the extruder housing 15 which heat or cool the material 18 may be located in the extruder housing 15. The heating 10 may be accomplished electrically and the cooling device 9 may comprise pipelines along which fluids are guided.

The feed opening 1, through which the material 18 may be fed to the conveyor screws 17, may be located at the top on the extruder housing 15.

A blower device 2 may be provided in the degassing housing 5, which may adjust a gas flow in the degassing housing 5, which may extract gaseous concomitant materials from the extruder housing 15 into the degassing housing 5 and from there may supply them to an exhaust air device 20, which may release the gas flow freed from material 18 to the outside. The exhaust air device 20 may be arranged contrary to the conveying direction 24 of the conveyor screw 17.

The gas flow which may pass from the extruder housing 15 into the degassing housing 5 may contain material particles. In a first step, in the screw elements, which may convey contrary to the air flow, the material particles may be deposited in the deflection zones and returned into the process space and in a next step captured by a filter disk 12 which can be located between the extruder housing 15 and the degassing housing 5.

After flowing through the degassing housing 5 and before entering into the exhaust air device 20, the concomitant material gas flow thus pre-purified may be freed from material particles still remaining in the gas flow by a filter 4.

At least one auxiliary extruder 22 may be provided in the degassing housing 5, which sits on a drive shaft 23 of the conveyor screw 17. The auxiliary extruder may be a screw shaft.

The auxiliary extruder 22 may comprise a shear edge screw 21 which by rotation of the auxiliary extruder 22, may free material residue from the side of the filter 4 facing the degassing housing 5.

The material residues released from the filter 4 may be fed by the auxiliary extruder 22 from the degassing housing 5 to the conveyor screw 17 located in the extruder housing 15.

It is particularly advantageous in the region of the intake and in particular also in the region of the filter scraper that in the longitudinal section the screw edge may be approximately perpendicular to the filter surface, that is the adhering product is not "pushed" into the gap, but rather is scraped from the filter surface.

It is further advantageous if, in the course of the side feeder screw, the shear edge profile may be initially converted into a normal sealing profile after the filling opening. A first volume reduction of about 20-35% may be accomplished.

The screw pitch may then be reduced in order to compact the material in the direction of the main extruder and be able to convey it into the main extruder at a certain pressure.

The screw of the auxiliary extruder 22 may have a smaller pitch than the screw of the conveyor screw 17.

The filter disk 12 can be identified between the extruder housing 15 and the degassing housing 5.

In order to increase the conveyor throughput, the conveyor screw 17 may have a large pitch and shear edge screws 6 in the region of the product supply.

Relative to the conveying direction 24, the degassing housing 5 may comprise a cooling device 7 and a heating device 10.

In the exhaust air device 20, a compressed air flushing device 3 may be provided which, by reversing the flow direction of the gas flow in the conveying direction 24, may free material residues adhering to the filter 4 and/or the filter disk 12, from the latter. The material residues may be supplied from the filter 4 to the auxiliary extruder 22 and transported from the latter into the extruder housing 15. Material residues adhering to the filter disk 12 may be supplied by the compressed air flushing device 14 directly to the conveyor screws 17 for further processing.

Figure 2:
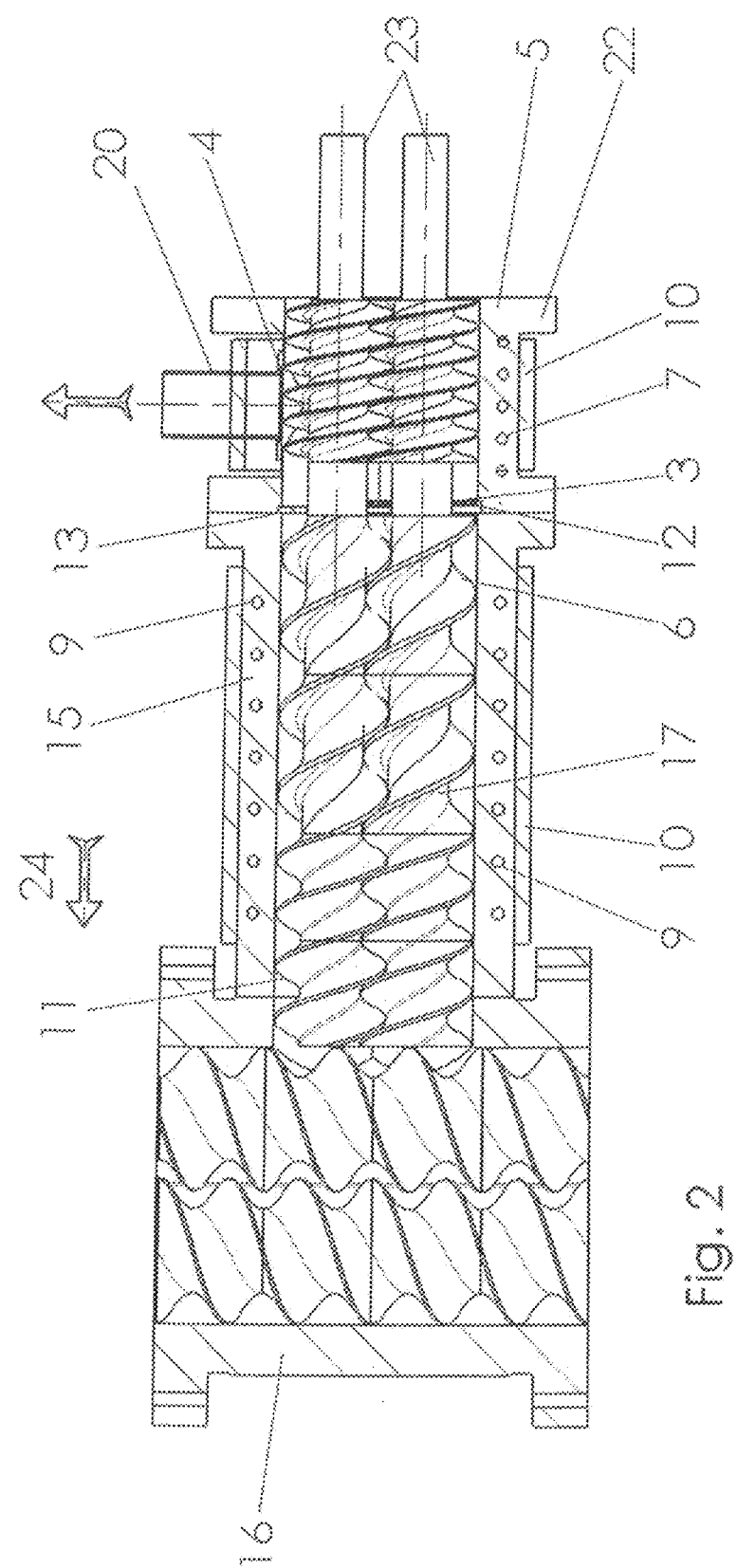
FIG. 2 shows the extruder system according to FIG. 1 viewed from above with the exhaust air device arranged laterally and FIG. 3 shows an extruder housing for a double-shaft extruder with filter disk and sealing element.

FIG. 2 shows in plan view the extruder system according to FIG. 1. The view on the left shows the main extruder 16 which may be adjoined contrary to the conveying direction 24 by the extruder housing 15 with the conveyor screws 17. Upstream in the conveying direction 24 the degassing housing 5 is shown adjacent to the extruder housing 15. In the extruder housing 15 the conveyor screws 17 are shown as double-shaft extruders which each may be driven by a drive shaft 23. Upstream contrary to the conveying direction 24, the auxiliary extruders 22 may sit on the drive shafts 23 in the degassing housing 5.

According to the view in FIG. 2, the pitch of the conveyor screws 17 may be greater than the pitch of the screws of the auxiliary extruder 22.

The extruder housing 15 may comprise a cooling system 9 as well as a heating device 10 whose cooling or heating pipes may convey corresponding heated or cooled fluids. In the view in FIG. 2, the conveyor screws 17 may have a standard profile 11. In the transition between the extruder housing 15 and the degassing housing 5, a sealing element 13 may sit on one drive shaft 23 which may seal the extruder housing 15 with respect to the degassing housing 5.

In the region of the drive shaft 23 of the adjacent conveyor screw 17, a filter disk 12 is shown which may filter off the material particles contained in the gas flow before entry into the degassing housing 5 and removes them from the gas flow.

The degassing housing 5 in FIG. 2 shows the auxiliary extruders 22 which may remove the material residues from the filter 4 and may supply them to the extruder housing 15.

In the region of the filter disk 12, a compressed air flushing device 3 is provided in FIG. 2, which may be used for separate cleaning of the filter disk 12.

FIGS. 1 and 2 show an outlet 26 for the removal of separated, in particular shaved-off, filter residues. From this the material residues may go into a collecting container 27 and from this, in a manner not shown, to the conveyor screw 17.

Figure 3:
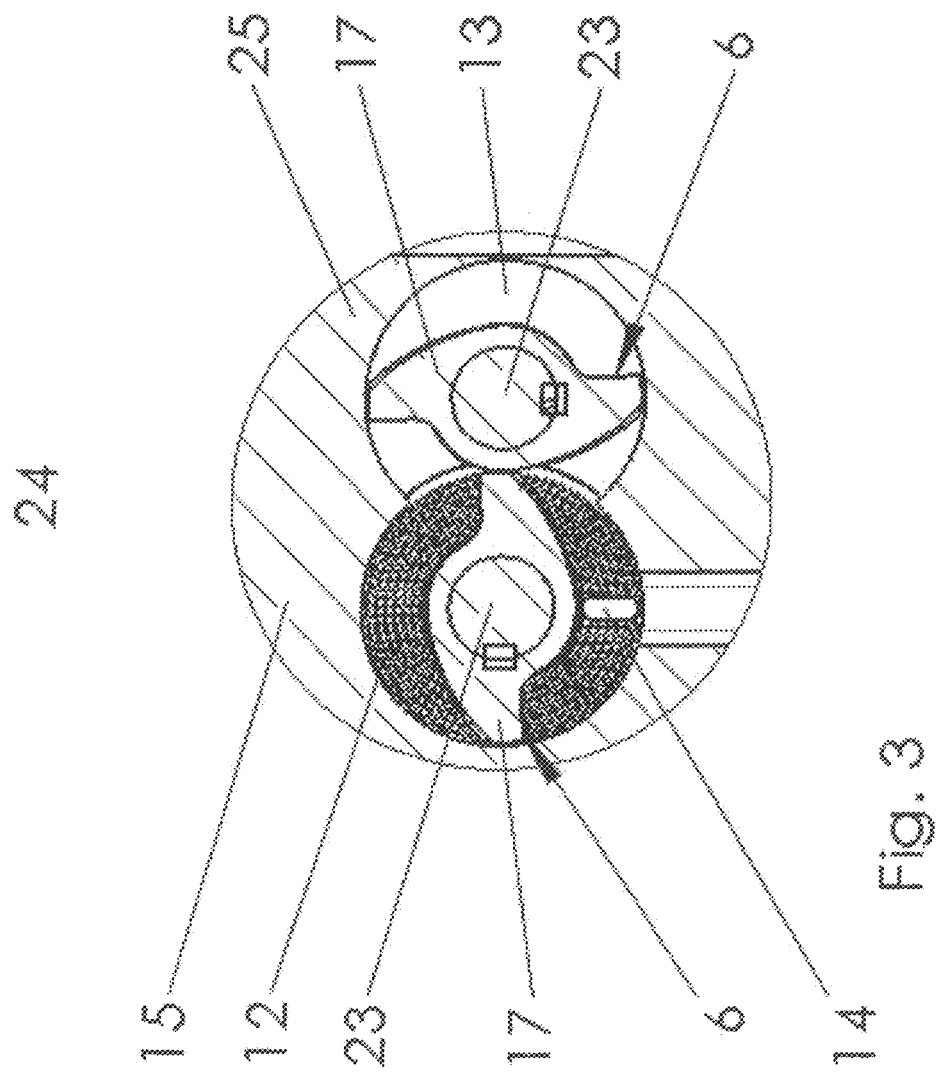

FIG. 3 shows the extruder housing 15 viewed in the conveying direction 24 in the region of a flange 25 which may be used to connect the extruder housing 15 to the degassing housing (not shown). The double-shaft conveyor screw 17 is shown in the extruder housing 15. Shown at the front on the left conveyor screw 17 in FIG. 3 is the filter disk 12 as well as a compressed air strip 14 which may be used for back flushing the filter disk 12.

The right conveyor screw 17 in FIG. 3 may be closed sealingly with respect to the degassing housing 5 (not shown) by a sealing element 13.

Figure 4:
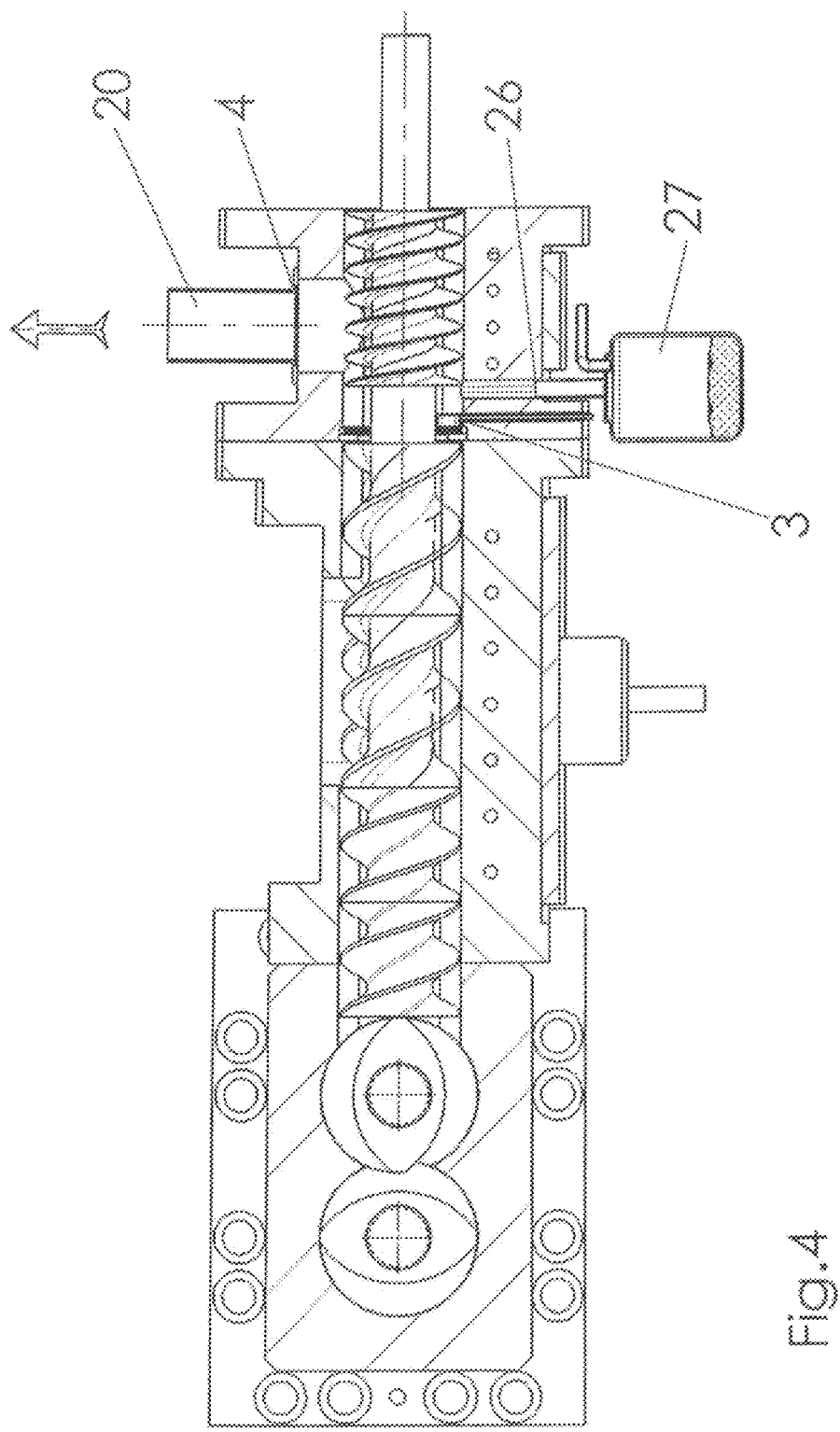
FIG. 4 shows an extruder system according to FIG. 1 with exhaust air device at the top (sectional front view)

FIG. 4 shows the extruder system according to the invention in a sectional front view where the exhaust air device 20 may be directed upwards.

The compressed air flushing device 3 and the filter 4 can be seen clearly in this view. The outlet 26 for the material residues or material particles as well as the collecting container 27 for the material particles can also be seen.

Figure 5:
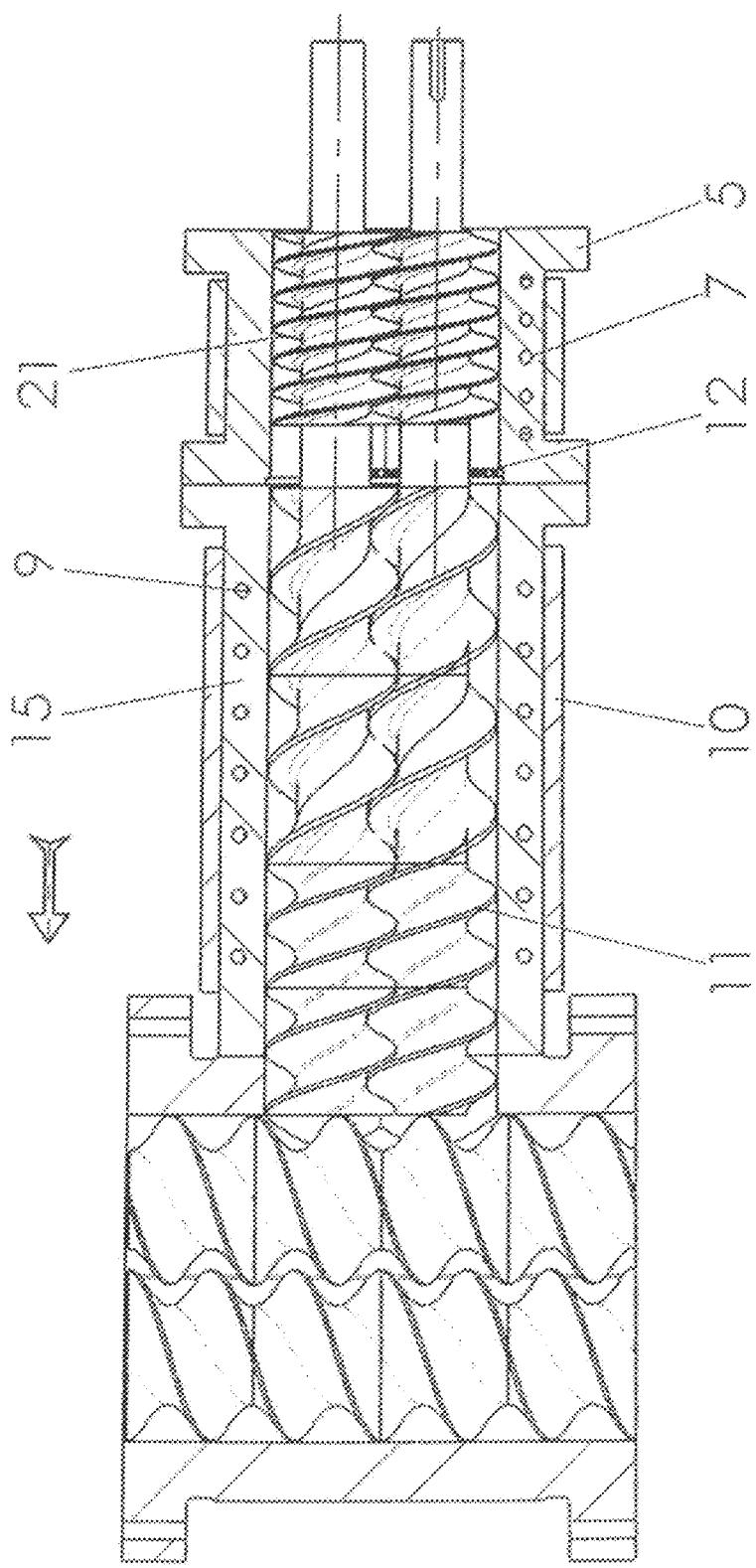
FIG. 5 shows an extruder system according to FIG. 1 with drain device at the top (sectional plan view)

FIG. 5 shows the extruder system according to the invention with the exhaust air device 20 which may be directed upwards in the sectional view of the plan view. The pitch of the conveyor screw 17 in the region of the extruder housing 15 can be seen, where a difference in the pitch of the conveyor screw 17 in the direction of the main extruder can be seen. FIG. 5 further shows the arrangement of the heater 10 and the filter disk 12 in the degassing housing 5. It can also be seen that the screw of the auxiliary extruder 22 may have a shear edge profile 21. The cooling of the degassing housing 5 is made clear by the reference number 7.

Figure 6:
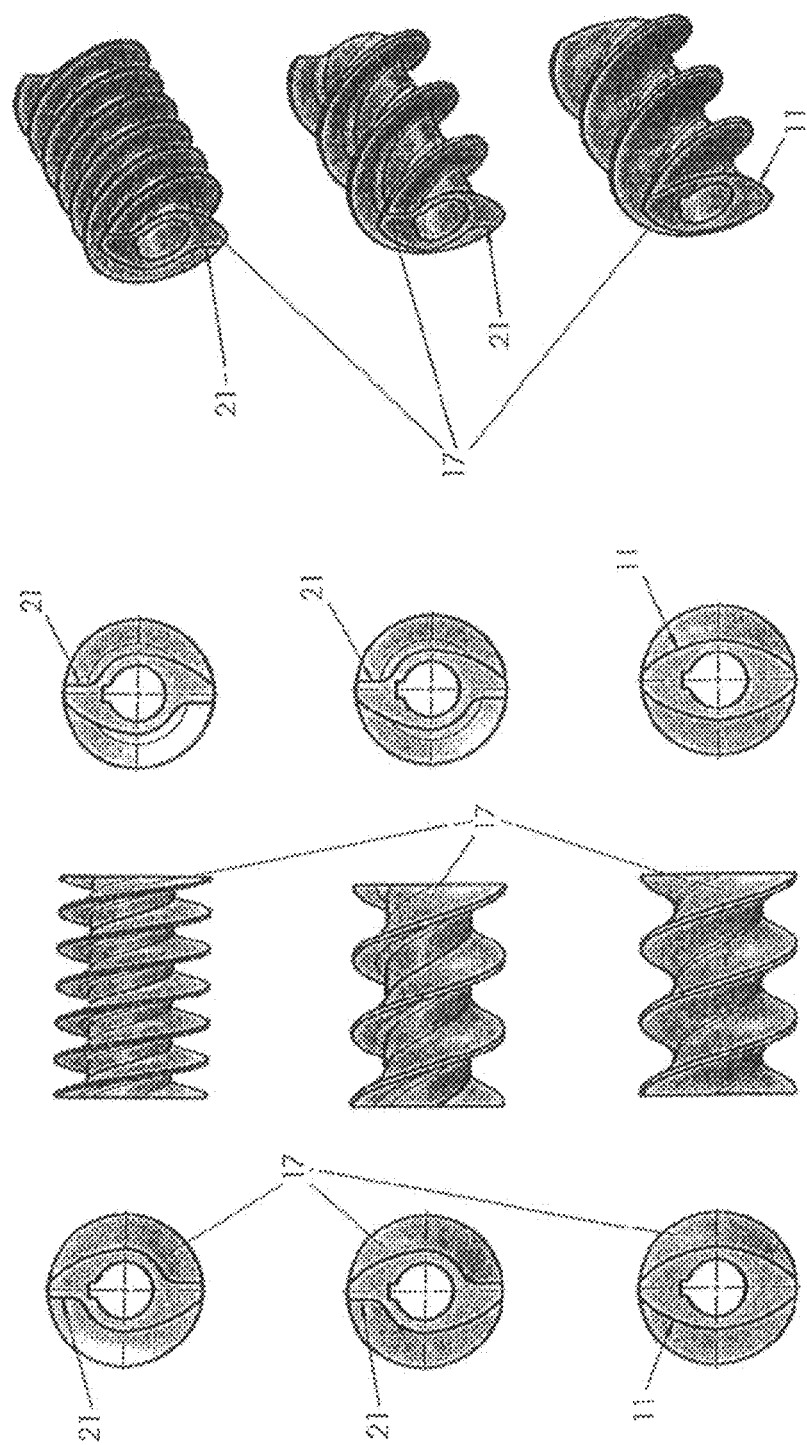
FIG. 6 shows components of the conveyor screw and the screw of the auxiliary extruder with different pitches and with shear edge profile and normal sealing profile.

FIG. 6 shows sections of the usable screws in the main extruder 16, in the extruder housing 15 and in the auxiliary extruder 22. The screws show a different pitch which, in the specific exemplary implementation, may be about 45° or about 90°. The conveyor screw 17 and also the screw of the auxiliary extruder 22 can have either a shear edge profile 21 or a standard profile 11. The elements with a shear edge generally may have a greater free volume than the elements having the standard profile or sealing profile. This initially gives a greater conveying volume. In the region of the intake and in particular also in the region of the filter scraper in the longitudinal section the screw edge may be approximately perpendicular to the filter surface so that the adhering product is not "pushed" into the gap, but rather may be scraped from the filter surface. In the course in particular of the side feeder screw 17, initially after the filling opening the shear edge profile should be converted into a normal sealing profile. A first volume reduction by about 20-35% may be accomplished. The screw pitch may then be reduced in order to compact the material in the direction of the main extruder and be able to convey it into the main extruder at a certain pressure. The relevant configuration of the conveyor screw 17 is also obtained in this case from FIGS. 1, 2, 4, and 5.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. A device for lateral flow charging of an extruder in which material is fed to at least one conveyor screw disposed in an extruder housing, wherein the material comprises gaseous concomitant materials, the device comprising a degassing housing for receiving an air flow disposed on the extruder housing, which air flow acts in the extruder housing and which is directed contrary to a conveying direction of the conveyor screw, wherein the degassing housing comprises an auxiliary extruder configured to return the material to the conveyor screw.

2. The device according to claim 1, comprising a vacuum in the extruder housing and/or in the degassing housing as a result of the alignment of the air flow directed contrary to the conveying direction of the conveyor screw.

3. The device according to claim 1, comprising a negative pressure in the extruder housing and/or in the degassing housing as a result of the alignment of the air flow directed contrary to the conveying direction of the conveyor screw.

4. The device according to claim 1, further comprising a feed opening configured to feed the material.

5. The device according to claim 4, wherein the feed opening and/or the degassing housing can be cooled or temperature-controlled.

6. The device according to claim 1, wherein the degassing housing comprises an exhaust air device delimited with respect to the degassing housing by a filter.

7. The device according to claim 6, wherein the exhaust air device and/or the filter can be cooled or temperature-controlled.

8. The device according to claim 6, wherein the air flow can be reversed for back flushing the filter.

9. The device according to claim 1, wherein the conveyor screw has a greater pitch than a screw of the auxiliary extruder.

10. The device according to claim 1, wherein the conveyor screw and/or the auxiliary extruder each has at least one shear edge.

11. The device according to claim 1, wherein the extruder housing is delimited from the degassing housing by a filter disk and/or by a sealing element.

12. The device according to claim 11, wherein the filter disk can be cooled or temperature-controlled.

13. The device according to claim 11, wherein the air flow can be reversed for back flushing the filter disk.

14. The device according to claim 1, further comprising a common drive shaft configured to driving the conveyor screw and the auxiliary extruder.

15. The device according to claim 1, wherein the conveyor screw and/or the auxiliary extruder is/are a single-shaft extruder or a multishaft extruder or a ring extruder.

* * * * *